United States Patent

Matsubara

[11] 4,013,346
[45] Mar. 22, 1977

[54] ENLARGING LENS SYSTEM

[75] Inventor: Masaki Matsubara, Hachiouji, Japan

[73] Assignee: Olympus Optical Co., Ltd., Tokyo, Japan

[22] Filed: Jan. 12, 1976

[21] Appl. No.: 648,569

[30] Foreign Application Priority Data

Jan. 13, 1975   Japan ............................... 50-6183

[52] U.S. Cl. .............................. 350/176; 350/214
[51] Int. Cl.² ...................... G02B 13/24; G02B 9/64
[58] Field of Search ............................. 350/214, 176

[56] References Cited

UNITED STATES PATENTS

| 3,351,412 | 11/1967 | Solisch et al. .................... 350/214 |
| 3,738,739 | 6/1973 | Glatzel et al. .................... 350/214 |
| 3,874,771 | 4/1975 | Behrens et al. ................... 350/214 |

*Primary Examiner*—John K. Corbin
*Assistant Examiner*—Conrad Clark
*Attorney, Agent, or Firm*—Cushman, Darby & Cushman

[57] ABSTRACT

An enlarging lens system comprising a front lens group which comprises a first, second, third and fourth lens components and a rear lens group which comprises a fifth, sixth and seventh lens components in which the first and second lens components are positive meniscus lenses, the third lens component is a positive meniscus lens consisting of a single lens or cemented doublet lens, the fourth lens component is a negative meniscus lens consisting of a single lens or cemented doublet lens, the fifth lens component is a negative meniscus lens consisting of a single lens or cemented doublet lens, and the sixth and seventh lens components are positive meniscus lenses, said enlarging lens system satisfying the following conditions.

$$1.75 < n_a < 1.85 \tag{1}$$

$$1.72 < n_b < 1.85 \tag{2}$$

$$0.3f < |f_a| < 0.8f \tag{3}$$

$$0.3f < |f_b| < 0.8f \tag{4}$$

$$0.4f < \frac{r_c}{n_c - 1} < 0.9f \tag{5}$$

$$0.3f < \frac{r_d}{n_d - 1} < 0.6f \tag{6}$$

$$0.8 < \frac{f_I}{f_{II}} < 1.5 \tag{7}$$

Said enlarging lens system has the aperture ratio of F/3.5 and field angle of 50° and is arranged so that at image of good quality can be obtained over the whole field.

6 Claims, 29 Drawing Figures

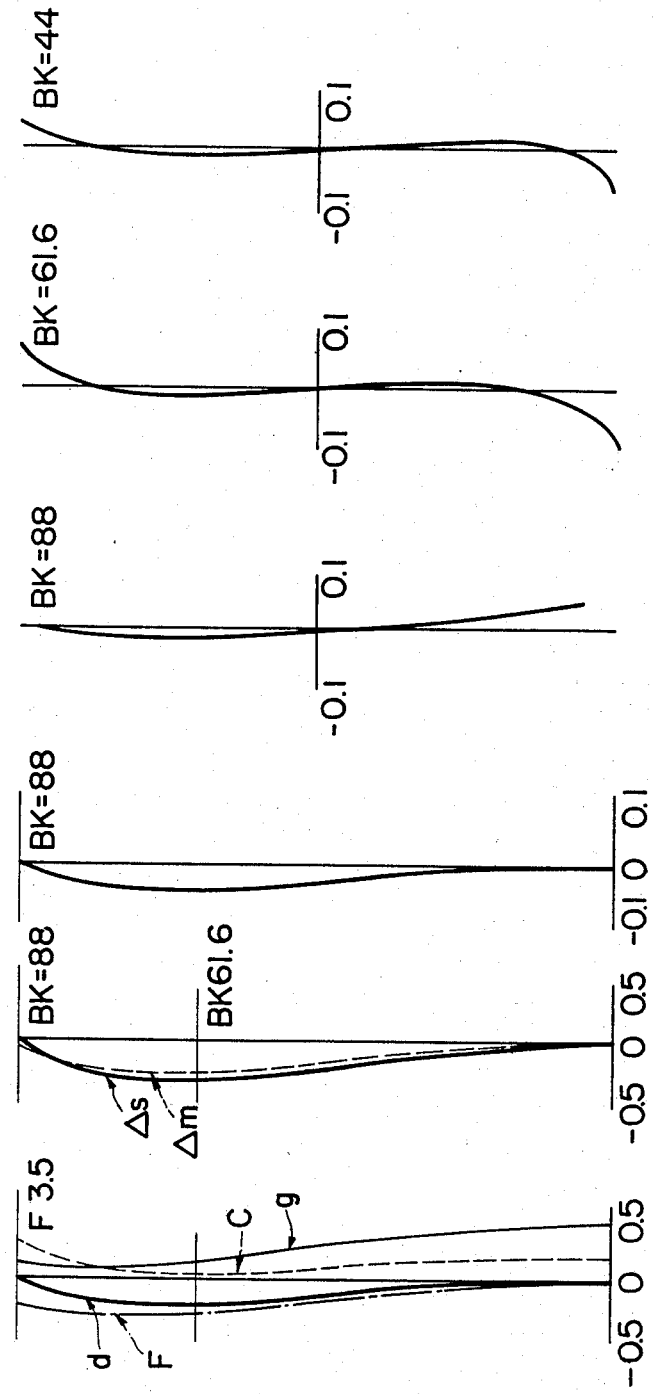

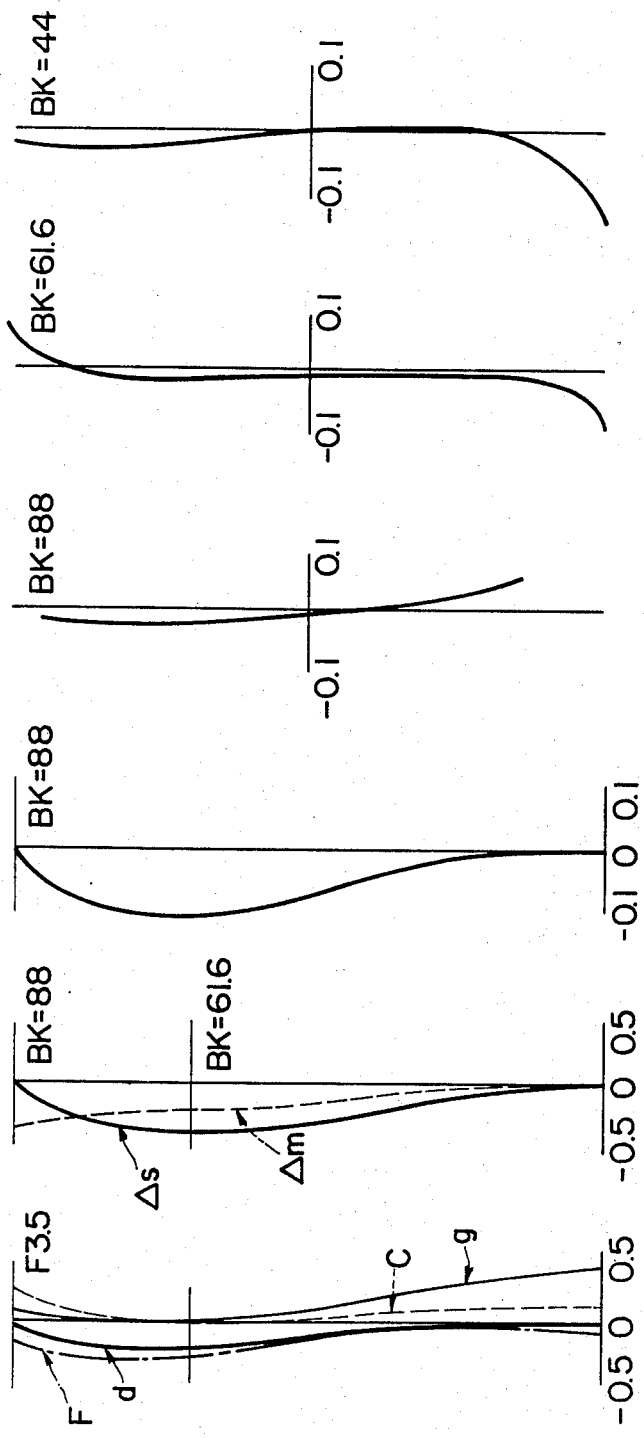

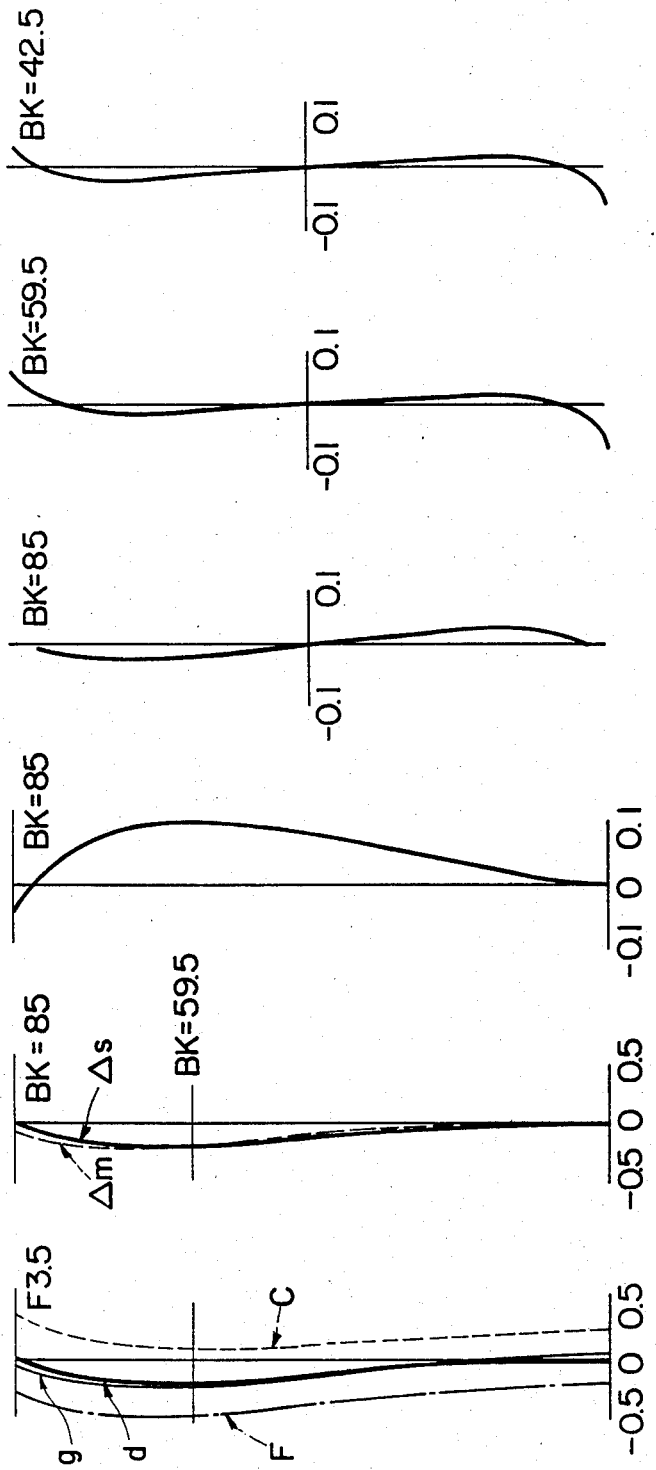

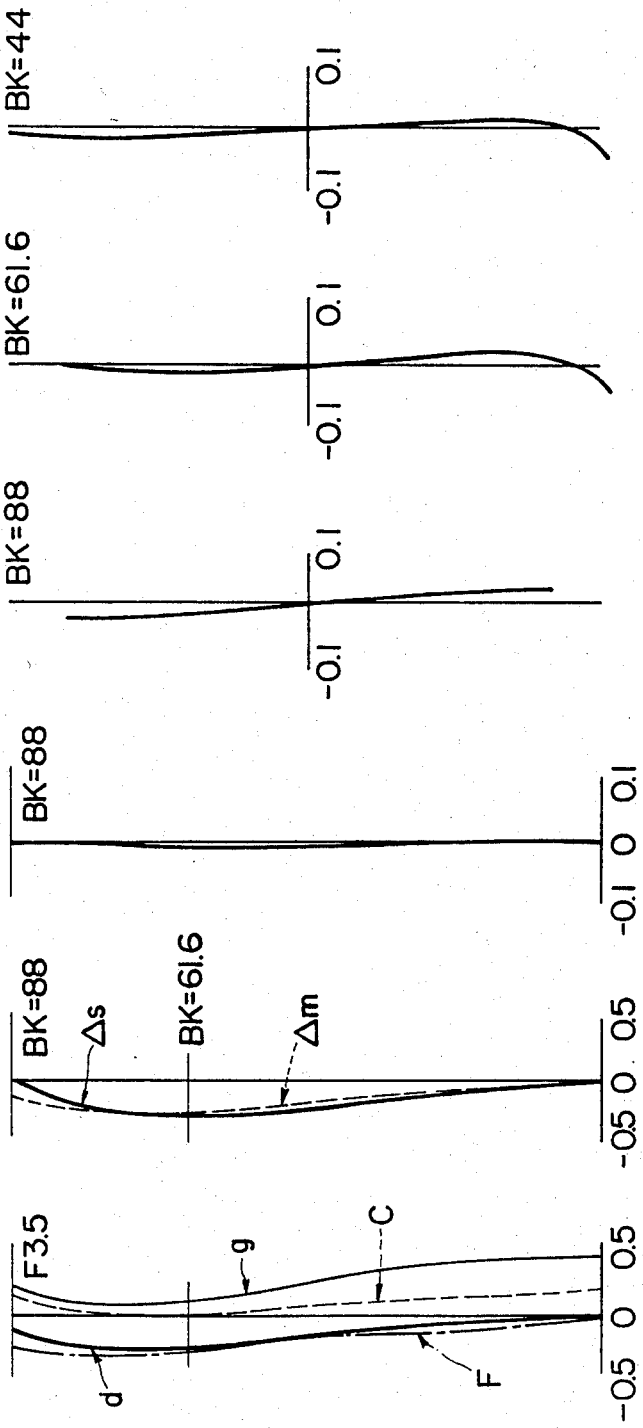

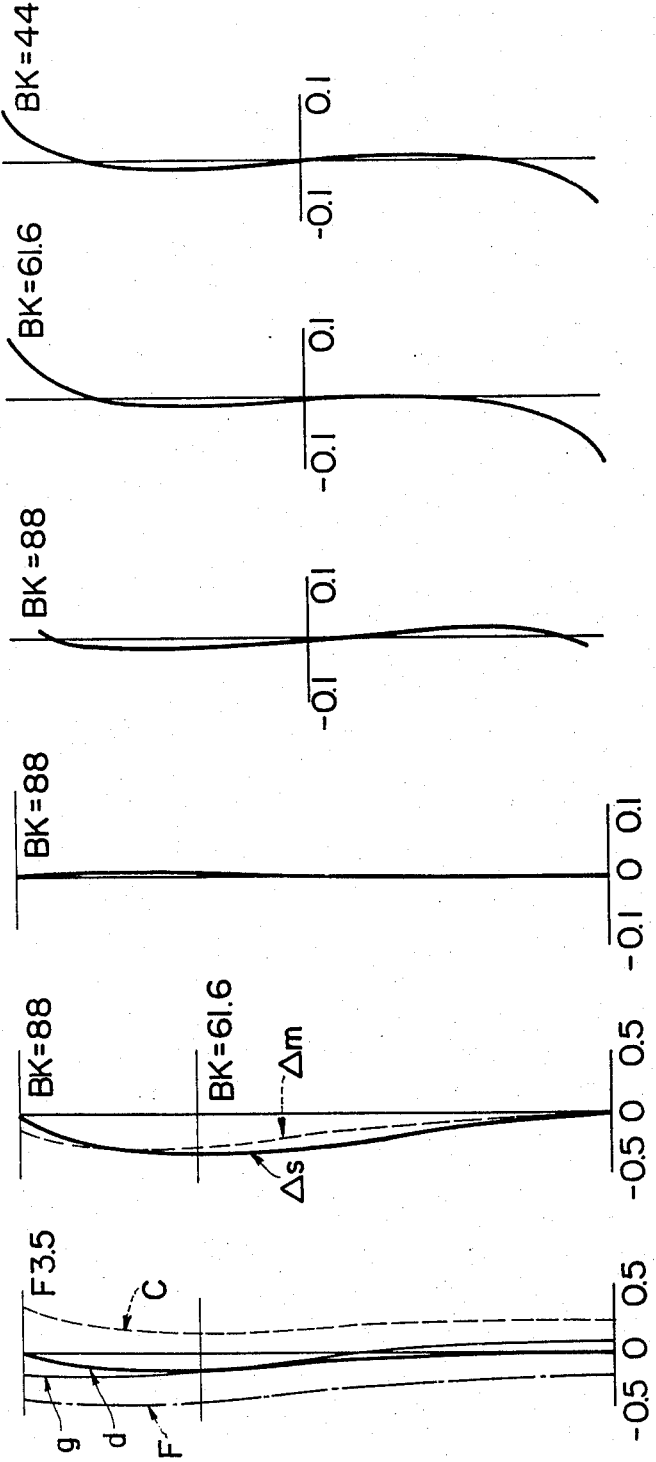

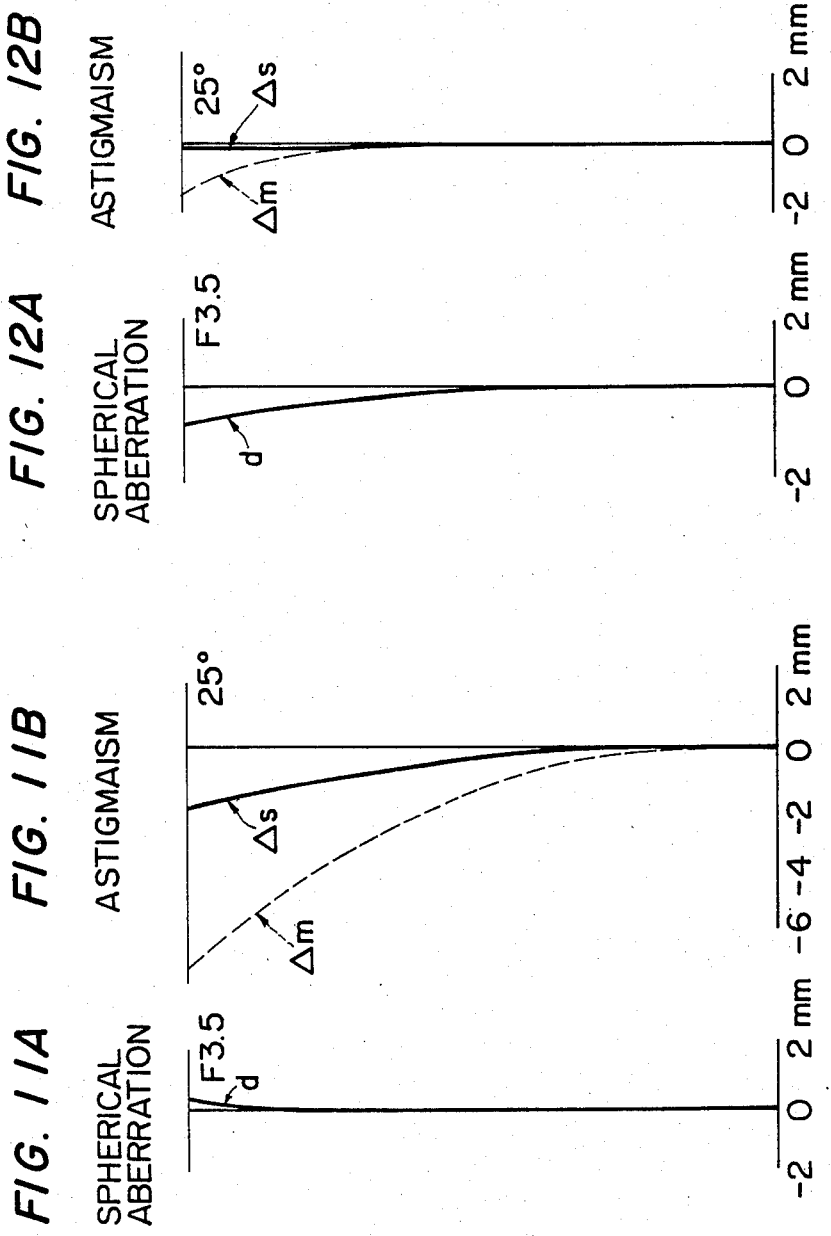

ENLARGING LENS SYSTEM

BACKGROUND OF THE INVENTION a. Field of the Invention

The present invention relates to an enlarging lens system for photomechanical process.

b. Description of the Prior Art

Unlike general photographic lenses, lens systems for photomechanical process must be so designed as to uniformly corrected various aberrations when objects at short distance are photographed since such lens systems are used for copying plane objects at short distance with high fidelity. Lens systems for photomechanical process must assure high image flatness and little distortion especially on large image planes. For satisfying these requirements, lens systems for photomechanical process must have long focal length and, therefore, it becomes rather difficult to design lens systems having large aperture ratios. Especially in case of enlarging lens systems, however, they should preferably have aperture ratios as large as possible since light intensity is attenuated so much during half-tone separation, masking, etc. in the photographing process that a long exposure time is required. Especially on a large image plane, image flatness is degraded and satisfactory images may not be obtained in circumferential areas.

SUMMARY OF THE INVENTION

It is, therefore, a primary object of the present invention to provide an enlarging lens system for photomechanical process which has magnification of X2 to X8, aperture ratio of F/3.5, field angle of 50° and wherein aberrations for objects at short distances are favourably corrected.

The enlarging lens system according to the present invention comprises a front lens group arranged on the object side of the stop and a rear lens group arranged on the image side of the stop, said front lens group comprising a first, second, third and fourth lens components, said rear lens group comprising a fifth, sixth and seventh lens components. In said front lens group, the first and second lens components are respectively positive meniscus lenses, the third lens component is a positive meniscus lens consisting of a single lens or cemented doublet lens, and the fourth lens component is a negative meniscus lens consisting of a single lens or cemented doublet lens. In said rear lens group, the fifth lens component is a negative meniscus lens consisting of a single lens or cemented doublet lens, and the sixth and seventh lens components are respectively positive meniscus lenses. Besides, the enlarging lens system according to the present invention is arranged to satisfy the following conditions when reference symbols $n_a$ and $n_b$ respectively represent refractive indices of negative meniscus lenses positioned on both sides of the stop, reference symbols $f_a$ and $f_b$ respectively represent focal lengths of said negative meniscus lenses, reference symbols $r_c$ and $r_d$ respectivley represent radii of curvature of convex lens surfaces on the outer side of the third and sixth lens components, reference symbols $n_c$ and $n_d$ respectively represent refractive indices of those lenses having said convex surfaces on the outer side, and reference symbols $f_I$ and $f_{II}$ respectively represent focal lengths of the front and rear lens groups.

$$1.75 < n_a < 1.85 \quad (1)$$

$$1.72 < n_b < 1.85 \quad (2)$$

$$0.3f < |f_a| < 0.8f \quad (3)$$

$$0.3f < |f_b| < 0.8f \quad (4)$$

$$0.4f < \frac{r_c}{n_c - 1} < 0.9f \quad (5)$$

$$0.3f < \frac{r_d}{n_d - 1} < 0.6f \quad (6)$$

$$0.8 < \frac{f_I}{f_{II}} < 1.5 \quad (7)$$

The enlarging lens system according to the present invention is characterized in that materials having large refractive indices are used for both of negative meniscus lenses positioned on both sides of the stop, concave surfaces of said negative meniscus lenses on the stop side being thereby arranged respectively as surfaces having large radii of curvature. Thus, the enlarging lens system according to the present invention is arranged to as far as possible prevent astigmatism and coma, which are offaxial aberrations, and spherical aberration, said astigmatism, coma and spherical aberrations being caused when radii of curvature of said concave surfaces are small. Besides, by limiting refractive powers of said negative meniscus lenses on both sides of the stop to adequate ranges, aberrations of the lens system are well balanced. Moreover, it is so arranged that radii of curvature of convex surfaces on the outer side of the third and sixth lens components will not respectively become very small in order to prevent spherical aberration to be caused when radii of curvature of said convex surfaces are small, because spherical aberration will be otherwise caused considerably when the aperture ratio becomes large. Furthermore, the enlarging lens system according to the present invention is arranged that refractive powers of the front and rear lens groups will not become unbalanced and that asymmetrical aberrations and distortion are thereby prevented.

Now, the afore-mentioned respective conditions are explained concretely. Conditions (1) and (2) relate to negative meniscus lenses positioned on both sides of the stop. In the course of correction of aberrations, it is generally so attempted to as far as possible correct aberrations by concave surfaces on the stop side of these negative meniscus lenses and, therefore, there is such tendency that radii of curvature of these concave surfaces become small. As a result, by these concave surfaces, peculiar spherical aberration and paraxial aberrations are caused. In the present invention, materials having large refractive indices are selected for these negative meniscus lenses as shown by conditions (1) and (2) so that radii of curvature of said concave surfaces on the stop side of said negative meniscus lenses will not become small and that the above-mentioned aberrations are thereby prevented as far as possible. When $n_a$ and/or $n_b$ in conditions (1) and (2) exceed their upper limits, it is possible to make radii of curvature of said concave surfaces on the stop side of said negative meniscus lenses large and, therefore, it is advantageous for prevention of the above-mentioned aberrations. In that case, however, said refractive indices become too large and results in reverse efffect for correction of Petzval's sum. Consequently, curvature of field will be aggravated and it becomes very difficult to obtain favourable image flatness and to thereby obtain an image of good quality even in circumferential areas which are both important for an enlarging lens system. When $n_a$ and/or $n_b$ become smaller than their lower limits, radii of curvature of said concave surfaces become too small. Consequently, the above-mentioned aberrations will be caused and it will become impossible to correct them by the other lenses.

Conditions (3) and (4) also relate to said negative meniscus lenses positioned on both sides of the stop and are intended to well balance aberrations by making refractive powers of said negative meniscus lenses weak. When $f_a$ and/or $f_b$ in these conditions exceed their upper limits, refractive powers of said negative meniscus lenses become too weak and, especially, correction of spherical aberration becomes insufficient. When $f_a$ and/or $f_b$ becomes smaller than their lower limits, refractive powers of said negative meniscus lenses become too strong. As a result, especially offaxial aberrations such as astigmatism and peculiar coma will be caused considerably and it will become impossible to correct them by the other lenses.

Conditions (5) and (6) relate to refractive powers of convex surfaces on outer side of positive meniscus lenses respectively constituting the third and sixth lens components. These convex surfaces have such tendency that their radii of curvature become large. When, however, their radii of curvature become large, spherical aberrations are caused considerably and it will become impossible to correct them by the other lenses. When, in conditions (5) and (6), $(r_c)/(n_c - 1)$ and/or $(r_d)/(n_d - 1)$ exceed their upper limits, refractive powers of said convex surfaces become weak and it is advantageous for prevention of spherical aberration. However, it becomes impossible to favourably correct the other aberrations such as astigmatism, coma, etc. When $(r_c)/(n_c - 1)$ and/or $(r_d)/(n_d - 1)$ become smaller than their lower limits, refractive powers of said convex surfaces become too strong and radii of curvature of said convex surfaces become too small. Consequently, spherical aberration will be caused considerably and it will become impossible to correct them by the other lenses.

The condition (7) relates to balance of refractive powers of the front and rear lens groups. In the present invention, it is intended to especially make the rear lens group compact and, therefore, it is impossible to arrange many lenses in the rear lens group. Consequently, it is necessary to make the refractive power of the rear lens group strong. When, however, the refractive power of the rear lens group is made too strong, there will occur a considerable difference between refractive powers of the front and rear lens groups. As a result, asymmetrical aberrations and distortion will be caused and it will become impossible to favourably balance aberrations of the lens system as a whole. The condition (7) is established by taking the above into consideration. If $(f_I/f_{II})$ in the condition (7) exceeds the upper limit, refractive power of the rear lens group becomes too strong and it becomes necessary to make refractive powers of respective lens surfaces in the rear lens group strong. As a result, considerable aberrations will be caused and it will become impossible to correct them favourably. When $(f_I/f_{II})$ becomes smaller than the lower limit, refractive power of the front lens group becomes too strong and it will become impossible to favourably balance aberrations of the lens system as a whole. Especially, it becomes impossible to correct distortion favourably.

Besides, the enlarging lens system according to the present invention is used by various magnifications within a pre-determined range of magnifications. When, however, the lens system is used by a magnification other than the design value, especially by a magnification largely different from the design value, aberrations will be aggravated considerably. Therefore, the lens system according to the present invention is also characterized in that some of lenses are arranged to be moved along the optical axis in order to prevent such aggravation of aberrations.

BRIEF DESCRIPTION OF DRAWINGS

FIGS. 6A, 6B, 6C and 6D respectively show graphs illustrating aberration curves of Embodiment 1 of the present invention;

FIGS. 7A, 7B, 7C and 7D respectively show graphs illustrating aberration curves of Embodiment 2;

FIGS. 8A, 8B, 8C and 8D respectively show graphs illustrating aberration curves of Embodiment 3;

FIGS. 9A, 9B, 9C and 9D respectively show graphs illustrating aberration curves of Embodiment 4;

FIGS. 10A, 10B, 10C and 10D respectively show graphs illustrating aberration curves of Embodiment 5;

FIGS. 11A and 11B respectively show graphs illustrating spherical aberration and astigmatism before correction when the lens system according to Embodiment 4 is used by a magnification other than the design magnification; and FIGS. 12A and 12B respectively show graphs illustrating spherical aberration and astigmatism after correction when the lens system according to Embodiment 4 is used by a magnification other than the design magnification.

DETAILED DESCRIPTION OF THE PREFERRED EMBODIMENTS

Figure 1:
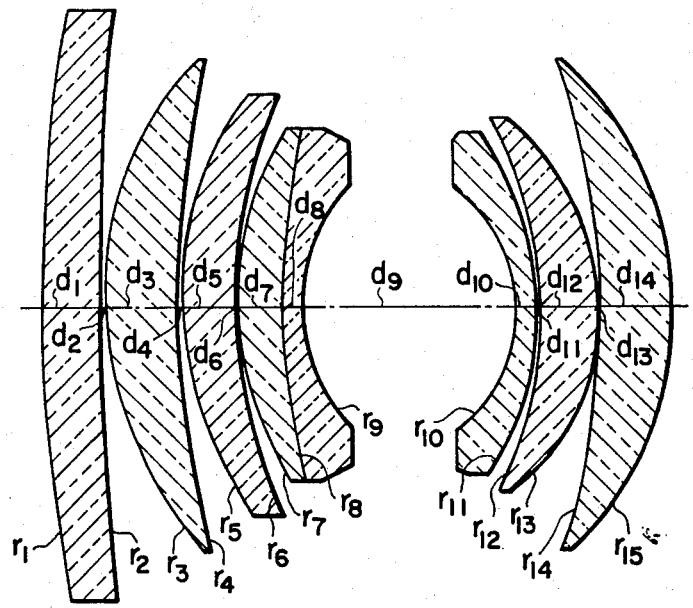
FIGS. 1 through 5 respectively show sectional views of respective embodiments of the lens system according to the present invention.

Preferred embodiments of the enlarging lens system according to the present invention are as shown below.

Embodiment 1

| | F/3.5 | Field angle 44° | f = 100 |
|---|---|---|---|
| $r_1$ | = 128.258 | | |
| | $d_1 = 6.48$ | $n_1 = 1.6385$ | $\nu_1 = 55.4$ |
| $r_2$ | = 377.420 | | |
| | $d_2 = 0.648$ | | |
| $r_3$ | = 38.492 | | |
| | $d_3 = 7.776$ | $n_2 = 1.6385$ | $\nu_2 = 55.4$ |
| $r_4$ | = 100.624 | | |
| | $d_4 = 0.648$ | | |
| $r_5$ | = 37.705 | | |
| | $d_5 = 5.832$ | $n_3 = 1.6385$ | $\nu_3 = 55.4$ |

-continued

| | | | |
|---|---|---|---|
| $r_6$ | = 53.286 | | |
| | $d_6 = 0.194$ | | |
| $r_7$ | = 35.748 | | |
| | $d_7 = 4.536$ | $n_4 = 1.5688$ | $\nu_4 = 56.1$ |
| $r_8$ | = 77.632 | | |
| | $d_8 = 2.592$ | $n_5 = 1.7830$ | $\nu_5 = 36.2$ |
| $r_9$ | = 19.134 | | |
| | $d_9 = 23.328$ | | |
| $r_{10}$ | = −17.102 | | |
| | $d_{10} = 2.592$ | $n_6 = 1.7400$ | $\nu_6 = 28.3$ |
| $r_{11}$ | = −31.184 | | |
| | $d_{11} = 0.324$ | | |
| $r_{12}$ | = −43.917 | | |
| | $d_{12} = 6.48$ | $n_7 = 1.6510$ | $\nu_7 = 56.2$ |
| $r_{13}$ | = −24.847 | | |
| | $d_{13} = 0.194$ | | |
| $r_{14}$ | = −78.162 | | |
| | $d_{14} = 7.77$ | $n_8 = 1.6510$ | $\nu_8 = 56.2$ |
| $r_{15}$ | = −37.016 | | |
| | $f_a = -33.1$, $f_b = -55.5$, $f_I = 127.1$, $f_{II} = 101.8$ | | |

Embodiment 2

| | | | |
|---|---|---|---|
| | F/3.5 | Filed angle 50° | f = 100 |
| $r_1$ | = 70.383 | | |
| | $d_1 = 7.956$ | $n_1 = 1.6425$ | $\nu_1 = 58.4$ |
| $r_2$ | = 395.198 | | |
| | $d_2 = 0.663$ | | |
| $r_3$ | = 35.957 | | |
| | $d_3 = 7.956$ | $n_2 = 1.6425$ | $\nu_2 = 58.4$ |
| $r_4$ | = 97.094 | | |
| | $d_4 = 0.663$ | | |
| $r_5$ | = 34.568 | | |
| | $d_5 = 5.039$ | $n_3 = 1.64$ | $\nu_3 = 60.3$ |
| $r_6$ | = 58.613 | | |
| | $d_6 = 1.459$ | | |
| $r_7$ | = 66.297 | | |
| | $d_7 = 2.519$ | $n_4 = 1.834$ | $\nu_4 = 37.2$ |
| $r_8$ | = 19.044 | | |
| | $d_8 = 22.542$ | | |
| $r_9$ | = −18.096 | | |
| | $d_9 = 2.519$ | $n_5 = 1.7552$ | $\nu_5 = 27.5$ |
| $r_{10}$ | = −31.347 | | |
| | $d_{10} = 0.332$ | | |
| $r_{11}$ | = −47.462 | | |
| | $d_{11} = 6.299$ | $n_6 = 1.651$ | $\nu_6 = 56.2$ |
| $r_{12}$ | = −26.394 | | |
| | $d_{12} = 0.398$ | | |
| $r_{13}$ | = −66.443 | | |
| | $d_{13} = 7.558$ | $n_7 = 1.651$ | $\nu_7 = 56.2$ |
| $r_{14}$ | = −34.809 | | |
| | $f_a = -32.8$, $f_b = -61.7$, $f_I = 134.2$, $f_{II} = 99.6$ | | |

Embodiment 3

| | | | |
|---|---|---|---|
| | F/3.5 | Field angle 42° | f = 100 |
| $r_1$ | = 48.639 | | |
| | $d_1 = 7.216$ | $n_1 = 1.6516$ | $\nu_1 = 58.7$ |
| $r_2$ | = 91.418 | | |
| | $d_2 = 0.656$ | | |
| $r_3$ | = 48.988 | | |
| | $d_3 = 7.216$ | $n_2 = 1.6516$ | $\nu_2 = 58.7$ |
| $r_4$ | = 81.826 | | |
| | $d_4 = 0.656$ | | |
| $r_5$ | = 37.383 | | |
| | $d_5 = 6.56$ | $n_3 = 1.6516$ | $\nu_3 = 58.7$ |
| $r_6$ | = 63.002 | | |
| | $d_6 = 0.787$ | | |
| $r_7$ | = 38.089 | | |
| | $d_7 = 2.624$ | $n_4 = 1.834$ | $\nu_4 = 37.2$ |
| $r_8$ | = 20.538 | | |
| | $d_8 = 24.272$ | | |
| $r_9$ | = −16.893 | | |
| | $d_9 = 2.624$ | $n_5 = 1.74$ | $\nu_5 = 31.7$ |
| $r_{10}$ | = −58.531 | | |
| | $d_{10} = 5.248$ | $n_6 = 1.67$ | $\nu_6 = 57.3$ |
| $r_{11}$ | = −28.444 | | |
| | $d_{11} = 0.328$ | | |
| $r_{12}$ | = −52.325 | | |
| | $d_{12} = 5.248$ | $n_7 = 1.6935$ | $\nu_7 = 53.3$ |
| $r_{13}$ | = −29.557 | | |
| | $d_{13} = 0.328$ | | |
| $r_{14}$ | = −76.464 | | |
| | $d_{14} = 6.56$ | $n_8 = 1.6935$ | $\nu_8 = 53.3$ |
| $r_{15}$ | = −43.464 | | |
| | $f_a = -57..4$, $f_b = -33.0$, $f_I = 125.1$, $f_{II} = 101.3$ | | |

Embodiment 4

| | | | |
|---|---|---|---|
| | F/3.5 | Field angle 46° | f = 100 |
| $r_1$ | = 63.528 | | |
| | $d_1 = 6.74$ | $n_1 = 1.64$ | $\nu_1 = 60.3$ |
| $r_2$ | = 148.306 | | |
| | $d_2 = 0.674$ | | |
| $r_3$ | = 45.92 | | |
| | $d_3 = 7.414$ | $n_2 = 1.64$ | $\nu_2 = 60.3$ |
| $r_4$ | = 100.742 | | |
| | $d_4 = 0.674$ | | |
| $r_5$ | = 33.882 | | |

-continued

| | | $d_5 = 7.414$ | $n_3 = 1.5927$ | $\nu_3 = 35.3$ |
|---|---|---|---|---|
| $r_6$ | = | 65.844 | | |
| | | $d_6 = 2.696$ | $n_4 = 1.8052$ | $\nu_4 = 25.4$ |
| $r_7$ | = | 48.492 | | |
| | | $d_7 = 0.337$ | | |
| $r_8$ | = | 37.885 | | |
| | | $d_8 = 2.696$ | $n_5 = 1.7618$ | $\nu_5 = 26.6$ |
| $r_9$ | = | 18.381 | | |
| | | $d_9 = 24.938$ | | |
| $r_{10}$ | = | −18.085 | | |
| | | $d_{10} = 2.696$ | $n_6 = 1.7618$ | $\nu_6 = 26.6$ |
| $r_{11}$ | = | −30.695 | | |
| | | $d_{11} = 0.337$ | | |
| $r_{12}$ | = | −43.975 | | |
| | | $d_{12} = 7.414$ | $n_7 = 1.6779$ | $\nu_7 = 53.4$ |
| $r_{13}$ | = | −25.074 | | |
| | | $d_{13} = 0.202$ | | |
| $r_{14}$ | = | −86.225 | | |
| | | $d_{14} = 7.414$ | $n_8 = 1.6779$ | $\nu_8 = 53.4$ |
| $r_{15}$ | = | −43.268 | | |
| | | $f_a = -63.7$, | $f_b = -49.9$, | $f_I = 131.4$, | $f_{II} = 93.9$ |

Embodiment 5

| | | F/3.5 | Field angle 44° | $f = 100$ |
|---|---|---|---|---|
| $r_1$ | = | 87.791 | | |
| | | $d_1 = 7.908$ | $n_1 = 1.6516$ | $\nu_1 = 58.7$ |
| $r_2$ | = | 232.55 | | |
| | | $d_2 = 0.659$ | | |
| $r_3$ | = | 34.433 | | |
| | | $d_3 = 7.908$ | $n_2 = 1.6516$ | $\nu_2 = 58.7$ |
| $r_4$ | = | 79.84 | | |
| | | $d_4 = 0.198$ | | |
| $r_5$ | = | 45.657 | | |
| | | $d_5 = 6.59$ | $n_3 = 1.5687$ | $\nu_3 = 63.2$ |
| $r_6$ | = | 82.021 | | |
| | | $d_6 = 2.636$ | $n_4 = 1.74$ | $\nu_4 = 31.7$ |
| $r_7$ | = | 51.276 | | |
| | | $d_7 = 0.33$ | | |
| $r_8$ | = | 31.693 | | |
| | | $d_8 = 2.636$ | $n_5 = 1.8074$ | $\nu_5 = 35.4$ |
| $r_9$ | = | 19.913 | | |
| | | $d_9 = 22.406$ | | |
| $r_{10}$ | = | −17.122 | | |
| | | $d_{10} = 2.636$ | $n_6 = 1.7495$ | $\nu_6 = 35.2$ |
| $r_{11}$ | = | −46.428 | | |
| | | $d_{11} = 3.954$ | $n_7 = 1.6516$ | $\nu_7 = 58.7$ |
| $r_{12}$ | = | −30.653 | | |
| | | $d_{12} = 0.198$ | | |
| $r_{13}$ | = | −55.529 | | |
| | | $d_{13} = 6.59$ | $n_8 = 1.64$ | $\nu_8 = 60.3$ |
| $r_{14}$ | = | −29.462 | | |
| | | $d_{14} = 0.198$ | | |
| $r_{15}$ | = | −82.255 | | |
| | | $d_{15} = 7.908$ | $n_9 = 1.64$ | $\nu_9 = 60.3$ |
| $r_{16}$ | = | −41.944 | | |
| | | $f_a = 73.7$, | $f_b = -37.6$, | $f_I = 102.2$, | $f_{II} = 119.6$ |

In the above, reference symbols, $r_1$, $r_2$, . . . respectively represent radii of curvature of respective lens surfaces, reference symbols $d_1$, $d_2$, . . . respectively represent thicknesses of respective lenses and airspaces between respective lenses, reference symbols $n_1$, $n_2$, . . . respectively represent refractive indices of respective lenses, and reference symbols $\nu_1$, $\nu_2$, . . . respectively represent Abbe's numbers of respective lenses.

Figure 2:
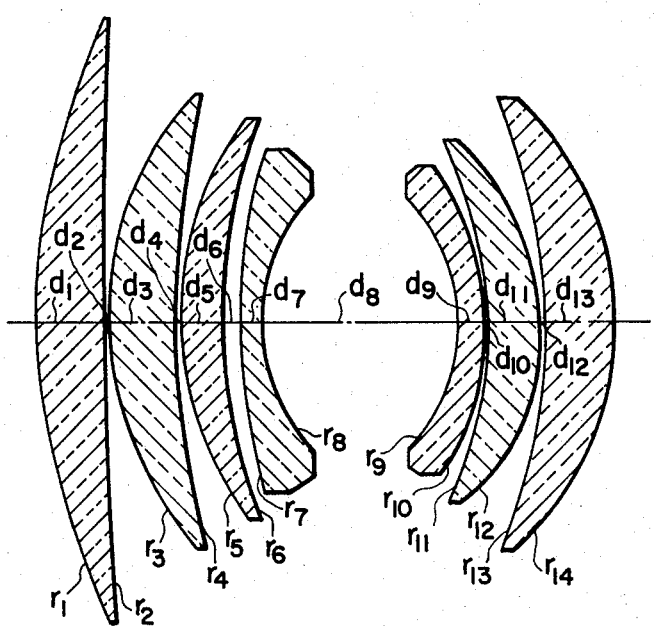
Figure 3:
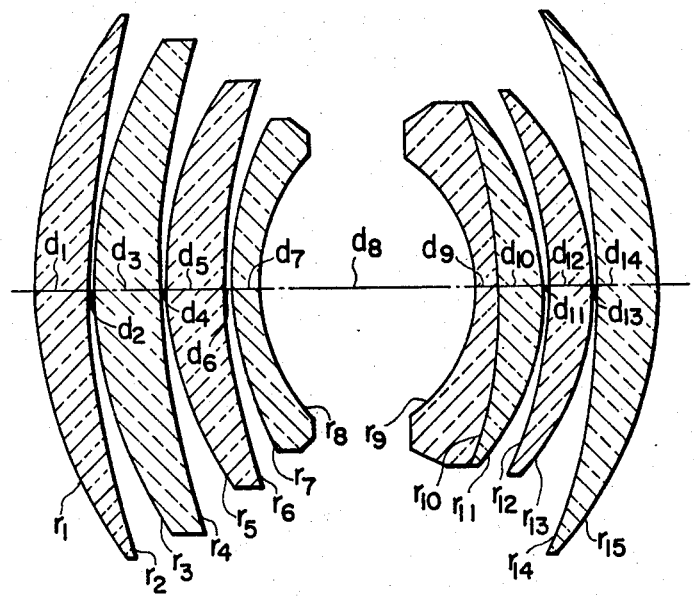
Figure 4:
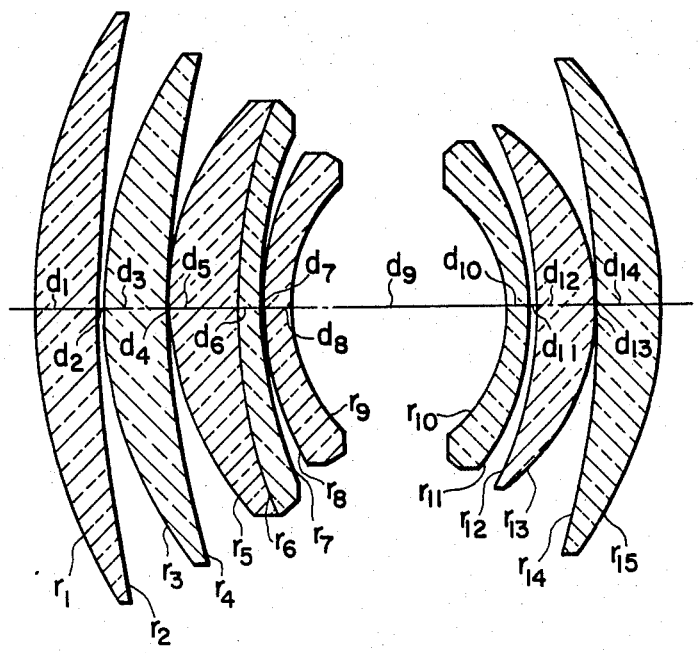
Figure 5:
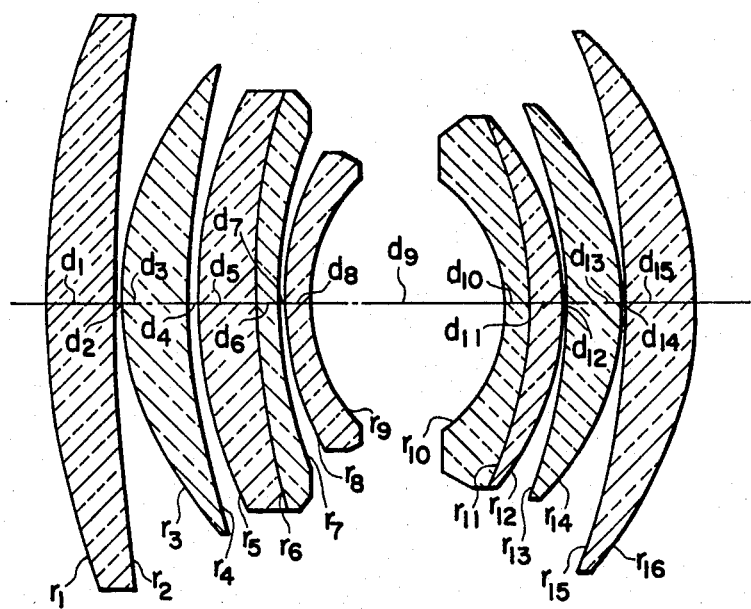

Numerical values of respective embodiments shown in the above are values at the magnification of X4, which is the design magnification of respective embodiments. Out of them, Embodiment 1 has lens configuration as shown in FIG. 1. As it is evident from FIG. 1, in Embodiment 1, the third lens component is a positive meniscus lens, the fourth lens component is a cemented doublet lens, the fifth lens component is a negative meniscus lens, and the sixth lens component is a positive meniscus lens. Therefore, $n_a$, $n_b$, $f_a$, $f_b$, $r_c$, $r_d$, $n_c$ and $n_d$ respectively correspond to $n_5$, $n_6$, $f_5$, $f_6$, $r_5$, $r_{13}$, $n_3$ and $n_7$. Embodiment 2 has lens configuration as shown in FIG. 2 in which the third, fourth, fifth and sixth lens components are all single lenses. Therefore, $n_a$, $n_b$, $f_a$, $f_b$, $r_c$, $r_d$, $n_c$ and $n_d$ respectively correspond to $n_4$, $n_5$, $f_4$, $f_5$, $r_5$, $r_{12}$, $n_3$ and $n_6$. Embodiment 3 has lens configuration as shown in FIG. 3 in which only the fifth lens component is a cemented doublet lens and all the other lens components are single lenses. Therefore, $n_a$, $n_b$, $f_a$, $f_b$, $n_c$, $n_d$, $r_c$ and $r_d$ respectively correspond to $n_4$, $n_5$, $f_4$, $f_5$, $n_3$, $n_7$, $r_5$ and $r_{13}$. Embodiment 4 has lens configuration as shown in FIG. 4 in which only the third lens component is a cemented doublet lens and all the other lens components are single lenses. Therefore, $n_a$, $n_b$, $f_a$, $f_b$, $n_c$, $n_d$, $r_c$ and $r_d$ respectively correspond to $n_5$, $n_6$, $f_5$, $f_6$, $n_3$, $n_7$, $r_5$ and $r_{13}$. Embodiment 5 has lens configuration as shown in FIG. 5 in which the third and fifth lens components are cemented doublet lenses and the other lens components are single lenses. Therefore, $n_a$, $n_b$, $f_a$, $f_b$, $n_c$, $n_d$, $r_c$ and $r_d$ respectively correspond to $n_5$, $n_6$, $f_5$, $f_6$, $n_3$, $n_8$, $r_5$ and $r_{14}$.

Besides, for the lens system according to the present invention, it is arranged as described already to correct aberrations, which will be aggravated when photographing with magnifications other than the design magnification, by moving a predetermined lens or lenses along the optical axis. As an example of the above correction, concrete numerical values are shown below referring to Embodiment 4. That is, for Embodiment 4, it is possible to correct aberrations as above by moving the fifth lens component positioned just behind the stop toward the stop, i.e., toward the object side as the magnification becomes larger. When the position of the fifth lens component at the time when the magnification is X7 is expressed by airspaces in front and rear of the fifth lens component, it becomes $d_9 = 24.438$ and $d_{11} = 0.837$. The state of correction of aberrations at that time is evident from FIGS. 11A and 11B and FIGS. 12A and 12B. That is, FIGS. 11A and 11B respectively show spherical aberration and astigmatism of Embodiment 4 when the magnification is X7 but the fifth lens component is not moved, i.e., before correction. On the other hand, FIGS. 12A and 12B respectively show spherical aberration and astigmatism of Embodiment 4 when the magnification is also X7 and the fifth lens component is moved, i.e., after correction.

I claim:

1. An enlarging lens system comprising a front lens group arranged on the object side of the stop and a rear lens group arranged on the image side of the stop, said front lens group comprising a first, second, third and fourth lens components, said first lens component being a positive meniscus lens, said second lens component being a positive meniscus lens, said third lens component having positive refractive power, said fourth lens component having negative refractive power, said rear lens group comprising a fifth, sixth and seventh lens components, said fifth lens component having negative refractive power, said sixth lens component being a positive meniscus lens, said seventh lens component being a positive meniscus lens, said enlarging lens system satisfying the following conditions:

$$1.75 < n_a < 1.85 \quad (1)$$

$$1.72 < n_b < 1.85 \quad (2)$$

$$0.3f < |f_a| < 0.8f \quad (3)$$

$$0.3f < |f_b| < 0.8f \quad (4)$$

$$0.4f < \frac{r_c}{n_c - 1} < 0.9f \quad (5)$$

$$0.3f < \frac{r_d}{n_d - 1} < 0.6f \quad (6)$$

$$0.8 < \frac{f_I}{f_{II}} < 1.5 \quad (7)$$

wherein reference symbols $n_a$ and $n_b$ respectively represent refractive indices of lenses respectively constituting the fourth and fifth lens components and positioned on the stop side therein (when the fourth and/or fifth lens components are single lenses, $n_a$ and $n_b$ respectively represent refractive indices of those single lenses), reference symbols $f_a$ and $f_b$ respectively represent focal lengths of said lenses on the stop side in the fourth and fifth lens components, reference symbols $n_c$ and $n_d$ respectively represent refractive indices of lenses respectively constituting the third and sixth lens components and positioned on the outer side therein (when the third and/or sixth lens components are single lenses, $n_c$ and $n_d$ respectively represent refractive indices of those single lenses), reference symbols $r_c$ and $r_d$ respectively represent radii of curvature of outer lens surfaces of the third and sixth lens components, and reference symbols $f_I$, $f_{II}$ and $f$ respectively represent focal lengths of the front lens group, rear lens group and lens system as a whole.

2. An enlarging lens system comprising a front lens group arranged on the object side of the stop and a rear lens group arranged on the image side of the stop, said front lens group comprising a first, second, third and fourth lens components, said first, second and third lens components respectively being positive meniscus lenses, said fourth lens component being a cemented negative meniscus doublet lens, said rear lens group comprising a fifth, sixth and seventh lens components, said fifth lens component being a negative meniscus lens, said sixth and seventh lens components respectively being positive meniscus lenses, said enlarging lens system having numerical values as given below:

| | F/3.5 | Field angle 44° | $f = 100$ | |
|---|---|---|---|---|
| $r_1$ | = 128.258 | | | |
| | $d_1 = 6.48$ | $n_1 = 1.6385$ | $\nu_1 = 55.4$ | |
| $r_2$ | = 377.420 | | | |
| | $d_2 = 0.648$ | | | |
| $r_3$ | = 38.492 | | | |
| | $d_3 = 7.776$ | $n_2 = 1.6385$ | $\nu_2 = 55.4$ | |
| $r_4$ | = 100.624 | | | |
| | $d_4 = 0.648$ | | | |
| $r_5$ | = 37.705 | | | |
| | $d_5 = 5.832$ | $n_3 = 1.6385$ | $\nu_3 = 55.4$ | |
| $r_6$ | = 53.286 | | | |
| | $d_6 = 0.194$ | | | |
| $r_7$ | = 35.748 | | | |
| | $d_7 = 4.536$ | $n_4 = 1.5688$ | $\nu_4\ 56.1$ | |
| $r_8$ | = 77.632 | | | |
| | $d_8 = 2.592$ | $n_5 = 1.7830$ | $\nu_5 = 36.2$ | |
| $r_9$ | = 19.134 | | | |
| | $d_9 = 23.328$ | | | |
| $r_{10}$ | = −17.102 | | | |
| | $d_{10} = 2.592$ | $n_6 = 1.7400$ | $\nu_6 = 28.3$ | |
| $r_{11}$ | = −31.184 | | | |
| | $d_{11} = 0.324$ | | | |
| $r_{12}$ | = −43.917 | | | |
| | $d_{12} = 6.48$ | $n_7 = 1.6510$ | $\nu_7 = 56.2$ | |
| $r_{13}$ | = −24.847 | | | |
| | $d_{13} = 0.194$ | | | |
| $r_{14}$ | = −78.162 | | | |
| | $d_{14} = 7.77$ | $n_8 = 1.6510$ | $\nu_8 = 56.2$ | |
| $r_{15}$ | = −37.016 | | | |
| | $f_a = -33.1$, | $f_b = -55.5$, | $f_I = 127.1$, | $f_{II} = 101.8$ | wherein reference symbols $r_1$ through $r_{15}$ respectively represent radii of curvature of respective lens surfaces, reference symbols $d_1$ through $d_{14}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbol $f_a$ represents the focal length of the lens constituting the fourth lens component and positioned on the stop side therein, reference symbol $f_b$ represents the focal length of the fifth lens component, and reference symbols $f_I$ and $f_{II}$ respectively represent focal lengths of the front and rear lens group.

3. An enlarging lens system comprising a front lens group arranged on the object side of the stop and a rear lens group arranged on the image side of the stop, said front lens group comprising a first, second, third and fourth lens components, said first, second and third lens components respectively being positive meniscus lenses, said fourth lens component being a negative meniscus lens, said rear lens group comprising a fifth, sixth and seventh lens components, said fifth lens component being a negative meniscus lens, said sixth and seventh lens components respectively being positive meniscus lenses, said enlarging lens system having numerical values as given below:

wherein reference symbols $r_1$ through $r_{14}$ respectively represent radii of curvature of respective lens surfaces, reference symbols $d_1$ through $d_{13}$ respectively represent thicknesses of respective lenses and airspaces between respective lenses, reference symbols $n_1$ through $n_7$ respectively represent refractive indices of respective lenses, reference symbols $\nu_1$ through $\nu_7$ respectively represent Abbe's numbers of respective lenses, reference symbols $f_a$ and $f_b$ respectively represent focal lengths of the fourth and fifth lens components, and reference symbols $f_I$ and $f_{II}$ respectively represent focal lengths of the front and rear lens groups.

4. An enlarging lens system comprising a front lens group arranged on the object side of the stop and a rear lens group arranged on the image side of the stop, said front lens group comprising a first, second, third and fourth lens components, said first, second and third lens components respectively being positive meniscus lenses, said fourth lens component being a negative meniscus lens, said rear lens group comprising a fifth, sixth and seventh lens components, said fifth lens component being a cemented negative meniscus doublet lens, said sixth and seventh lens components respectively being positive meniscus lenses, said enlarging lens system having numerical values as given below:

|  | F/3.5 | Field angle 50° | f = 100 |
|---|---|---|---|
| $r_1$ | = 70.383 | | |
| | $d_1 = 7.956$ | $n_1 = 1.6425$ | $\nu_1 = 58.4$ |
| $r_2$ | = 395.198 | | |
| | $d_2 = 0.663$ | | |
| $r_3$ | = 35.957 | | |
| | $d_3 = 7.956$ | $n_2 = 1.6425$ | $\nu_2 = 58.4$ |
| $r_4$ | = 97.094 | | |
| | $d_4 = 0.663$ | | |
| $r_5$ | = 34.568 | | |
| | $d_5 = 5.039$ | $n_3 = 1.64$ | $\nu_3 = 60.3$ |
| $r_6$ | = 58.613 | | |
| | $d_6 = 1.459$ | | |
| $r_7$ | = 66.297 | | |
| | $d_7 = 2.519$ | $n_4 = 1.834$ | $\nu_4 = 37.2$ |
| $r_8$ | = 19.044 | | |
| | $d_8 = 22.542$ | | |
| $r_9$ | = −18.096 | | |
| | $d_9 = 2.519$ | $n_5 = 1.7552$ | $\nu_5 = 27.5$ |
| $r_{10}$ | = −31.347 | | |
| | $d_{10} = 0.332$ | | |
| $r_{11}$ | = −47.462 | | |
| | $d_{11} = 6.299$ | $n_6 = 1.651$ | $\nu_6 = 56.2$ |
| $r_{12}$ | = −26.394 | | |
| | $d_{12} = 0.398$ | | |
| $r_{13}$ | = −66.443 | | |
| | $d_{13} = 7.558$ | $n_7 = 1.651$ | $\nu_7 = 56.2$ |
| $r_{14}$ | = −34.809 | | |
| | $f_a = -32.8$, | $f_b = -61.7$, | $f_I = 134.2$, $f_{II} = 99.6$ |

|  | F/3.5 | Field angle 42° | f = 100 |
|---|---|---|---|
| $r_1$ | = 48.639 | | |
| | $d_1 = 7.216$ | $n_1 = 1.6516$ | $\nu_1 = 58.7$ |
| $r_2$ | = 91.418 | | |
| | $d_2 = 0.656$ | | |
| $r_3$ | = 48.988 | | |
| | $d_3 = 7.216$ | $n_2 = 1.6516$ | $\nu_2 = 58.7$ |
| $r_4$ | = 81.826 | | |
| | $d_4 = 0.656$ | | |
| $r_5$ | = 37.383 | | |
| | $d_5 = 6.56$ | $n_3 = 1.6516$ | $\nu_3 = 58.7$ |
| $r_6$ | = 63.002 | | |
| | $d_6 = 0.787$ | | |
| $r_7$ | = 38.089 | | |
| | $d_7 = 2.624$ | $n_4 = 1.834$ | $\nu_4 = 37.2$ |
| $r_8$ | = 20.538 | | |
| | $d_8 = 24.272$ | | |
| $r_9$ | = −16.893 | | |
| | $d_9 = 2.624$ | $n_5 = 1.74$ | $\nu_5 = 31.7$ |
| $r_{10}$ | = −58.531 | | |
| | $d_{10} = 5.248$ | $n_6 = 1.67$ | $\nu_6 = 57.3$ |
| $r_{11}$ | = −28.444 | | |
| | $d_{11} = 0.328$ | | |

-continued

| | | | |
|---|---|---|---|
| $r_{12}$ | = −52.325 | | |
| | $d_{12} = 5.248$ | $n_7 = 1.6935$ | $\nu_7 = 53.3$ |
| $r_{13}$ | = −29.557 | | |
| | $d_{13} = 0.328$ | | |
| $r_{14}$ | = −76.464 | | |
| | $d_{14} = 6.56$ | $n_8 = 1.6935$ | $\nu_8 = 53.3$ |
| $r_{15}$ | = −43.464 | | |
| | $f_a = -57.4$, | $f_b = -33.0$, | $f_I = 125.1$, $f_{II} = 101.3$ | wherein reference symbols $r_1$ through $r_{15}$ respectively represent radii of curvature of respective lens surfaces, reference symbols $d_1$ through $d_{14}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbol $f_a$ represents the focal length of the fifth lens component, reference symbol $f_b$ represents the focal length of the lens constituting the fifth lens component and positioned on the stop side therein, and reference symbols $f_I$ and $f_{II}$ respectively represent focal lengths of the front and rear lens groups.

5. An enlarging lens system comprising a front lens group arranged on the object side of the stop and a rear lens group arranged on the image side of the stop, said front lens group comprising a first, second, third and fourth lens components, said first and second lens components respectively being positive meniscus lenses, said third lens component being a cemented positive meniscus doublet lens, said fourth lens component being a negative meniscus lens, said rear lens group comprising a fifth, sixth and seventh lens components, said fifth lens component being a negative meniscus lens, said sixth and seventh lens components respectively being positive meniscus lenses, said enlarging lens system having numerical values as given below:

wherein reference symbols $r_1$ through $r_{15}$ respectively represent radii of curvature of respective lens surfaces, reference symbols $d_1$ through $d_{14}$ respectively represent thicknesses of respective lenses and airspaces between respective lenses, reference symbols $n_1$ through $n_8$ respectively represent refractive indices of respective lenses, reference symbols $\nu_1$ through $\nu_8$ respectively represent Abbe's numbers of respective lenses, reference symbols $f_a$ and $f_b$ respectively represent focal lengths of the fourth and fifth lens components, and reference symbols $f_I$ and $f_{II}$ respectively represent focal lengths of the front and rear lens groups.

6. An enlarging lens system comprising a front lens group arranged on the object side of the stop and a rear lens group arranged on the image side of the stop, said front lens group comprising a first, second, third and fourth lens components, said first and second lens components respectively being positive meniscus lenses, said third lens component being a cemented positive meniscus doublet lens, said fourth lens component being a negative meniscus lens, said rear lens group comprising a fifth, sixth and seventh lens components, said fifth lens component being a cemented negative meniscus doublet lens, said sixth and seventh lens components respectively being positive meniscus lenses, said enlarging lens system having numerical values as given below:

| | F/3.5 | Field angle 46° | f = 100 |
|---|---|---|---|
| $r_1$ | = 63.528 | | |
| | $d_1 = 6.74$ | $n_1 = 1.64$ | $\nu_1 = 60.3$ |
| $r_2$ | = 148.306 | | |
| | $d_2 = 0.674$ | | |
| $r_3$ | = 45.92 | | |
| | $d_3 = 7.414$ | $n_2 = 1.64$ | $\nu_2 = 60.3$ |
| $r_4$ | = 100.742 | | |
| | $d_4 = 0.674$ | | |
| $r_5$ | = 33.882 | | |
| | $d_5 = 7.414$ | $n_3 = 1.5927$ | $\nu_3 = 35.3$ |
| $r_6$ | = 65.844 | | |
| | $d_6 = 2.696$ | $n_4 = 1.8052$ | $\nu_4 = 25.4$ |
| $r_7$ | = 48.492 | | |
| | $d_7 = 0.337$ | | |
| $r_8$ | = 37.885 | | |
| | $d_8 = 2.696$ | $n_5 = 1.7618$ | $\nu_5 = 26.6$ |
| $r_9$ | = 18.381 | | |
| | $d_9 = 24.938$ | | |
| $r_{10}$ | = −18.085 | | |
| | $d_{10} = 2.696$ | $n_6 = 1.7618$ | $\nu_6 = 26.6$ |
| $r_{11}$ | = −30.695 | | |
| | $d_{11} = 0.337$ | | |
| $r_{12}$ | = −43.975 | | |
| | $d_{12} = 7.414$ | $n_7 = 1.6779$ | $\nu_7 = 53.4$ |
| $r_{13}$ | = −25.074 | | |
| | $d_{13} = 0.202$ | | |
| $r_{14}$ | = −86.225 | | |
| | $d_{14} = 7.414$ | $n_8 = 1.6779$ | $\nu_8 = 53.4$ |
| $r_{15}$ | = −43.268 | | |
| | $f_a = -63.7$, | $f_b = -49.9$, | $f_I = 131.4$, $f_{II} = 93.9$ |

| | F/3.5 | Field angle 44° | f = 100 |
|---|---|---|---|
| $r_1$ | = 87.791 | | |
| | $d_1 = 7.908$ | $n_1 = 1.6516$ | $\nu_1 = 58.7$ |

-continued

| | | | |
|---|---|---|---|
| $r_2$ | = 232.55 | | |
| | $d_2 = 0.659$ | | |
| $r_3$ | = 34.433 | | |
| | $d_3 = 7.908$ | $n_2 = 1.6516$ | $\nu_2 = 58.7$ |
| $r_4$ | = 79.84 | | |
| | $d_4 = 0.198$ | | |
| $r_5$ | = 45.657 | | |
| | $d_5 = 6.59$ | $n_3 = 1.5687$ | $\nu_3 = 63.2$ |
| $r_6$ | = 82.021 | | |
| | $d_6 = 2.636$ | $n_4 = 1.74$ | $\nu_4 = 31.7$ |
| $r_7$ | = 51.276 | | |
| | $d_7 = 0.33$ | | |
| $r_8$ | = 31.693 | | |
| | $d_8 = 2.636$ | $n_5 = 1.8074$ | $\nu_5 = 35.4$ |
| $r_9$ | = 19.913 | | |
| | $d_9 = 22.406$ | | |
| $r_{10}$ | = −17.122 | | |
| | $d_{10} = 2.636$ | $n_6 = 1.7495$ | $\nu_6 = 35.2$ |
| $r_{11}$ | = −46.428 | | |
| | $d_{11} = 3.954$ | $n_7 = 1.6516$ | $\nu_7 = 58.7$ |
| $r_{12}$ | = −30.653 | | |
| | $d_{12} = 0.198$ | | |
| $r_{13}$ | = −55.529 | | |
| | $d_{13} = 6.59$ | $n_8 = 1.64$ | $\nu_8 = 60.3$ |
| $r_{14}$ | = −29.462 | | |
| | $d_{14} = 0.198$ | | |
| $r_{15}$ | = −82.255 | | |
| | $d_{15} = 7.908$ | $n_9 = 1.64$ | $\nu_9 = 60.3$ |
| $r_{16}$ | = −41.944 | | |
| | $f_a = -73.7$, | $f_b = -37.6$, | $f_I = 102.2$, $f_{II} = 119.6$ | wherein reference symbols $r_1$ through $r_{16}$ respectively represent radii of curvature of respective lens surfaces, reference symbols $d_1$ through $d_{15}$ respectively represent thicknesses of respective lenses and airspaces between respective lenses, reference symbols $n_1$ through $n_9$ respectively represent refractive indices of respective lenses, reference symbols $\nu_1$ through $\nu_9$ respectively represent Abbe's numbers of respective lenses, reference symbol $f_a$ represents the focal length of the fourth lens component, reference symbol $f_b$ represents the focal length of the lens constituting the fifth lens component and positioned on the stop side therein, and reference symbols $f_I$ and $f_{II}$ respectively represent focal lengths of the front and rear lens components.

* * * * *